United States Patent [19]

Johnson

[11] Patent Number: 4,705,437

[45] Date of Patent: Nov. 10, 1987

[54] REVERSIBLE DUAL SPEED TAPPING ATTACHMENT

[75] Inventor: Allan S. Johnson, Newport Beach, Calif.

[73] Assignee: Tapmatic Corporation, Irvine, Calif.

[21] Appl. No.: 697,857

[22] Filed: Feb. 4, 1985

[51] Int. Cl.[4] ............................ B23G 3/02; B23G 5/14
[52] U.S. Cl. .................................. 408/139; 10/136 TS; 74/378; 192/21; 192/48.7; 192/51
[58] Field of Search ..................... 408/139, 140–142, 408/133; 74/665 GB, 664, 377, 378; 10/89 F, 89 H, 136 R, 136 TS, 141 H; 192/21, 48.7, 48.91, 51; 408/133

[56] References Cited

U.S. PATENT DOCUMENTS 2,454,293  11/1948  Waseige ..................... 74/665 GB
3,005,527  10/1961  Zagar ................................ 192/51
3,051,013   8/1962  Zagar ......................... 408/139 X
4,123,192  10/1978  Ruland ............................. 10/89 F X
4,277,209   7/1981  Benjamin et al. ................. 408/139

OTHER PUBLICATIONS

Allan A. Candee, "Gears and Gear Cutting", Reprinted from *American Machinist*, Sep. 17–Oct. 29, 1942.

Primary Examiner—Gil Weidenfeld
Assistant Examiner—Steven C. Bishop
Attorney, Agent, or Firm—Evanns & Walsh

[57] ABSTRACT

A tapping attachment includes a free axial float spindle having drive balls associated therewith, a forward driving member having splines engageable with the driving balls of the spindle which operates at a first rate speed, a counter-rotating reverse drive member which operates at a second rate of speed, having splines associatable with the drive balls of the spindle, means for causing simultaneous rotation of the forward and reverse drive members.

2 Claims, 3 Drawing Figures

REVERSIBLE DUAL SPEED TAPPING ATTACHMENT

BACKGROUND OF THE INVENTION

1. Field of the Invention

This invention relates to automatically reversing tapping attachments and particularly such tapping attachments which rotate in forward and reverse drive at different rates of speed.

2. Description of the Prior Art

The background of art with respect to tapping attachments such as the present invention is exemplified in prior patents of this inventor, to wit U.S. Pat. Nos. 3,002,206; 3,041,893; 3,397,588; 3,717,892; 3,791,756; 3,946,844; 3,999,642; and 4,014,421, and co-pending U.S. patent applications Ser. No. 641,431 entitled Tapping Attachment and Drive Train Therefore, filed Aug. 16, 1984, and now abandoned; and 06-641,381, entitled Automatic Tapping Attachment and Drive System Therefore, filed Aug. 16, 1984, now abandoned all of which are hereby incorporated herein by reference as though set forth fully. The background patents disclose the characteristics of tapping attachments of the present type and of basic operating advantages thereof.

SUMMARY OF THE INVENTION

The present invention relates to tapping attachments of the type which have a drive spindle which is permitted to freely float axially with respect to the housing in which it is carried and which use rolling balls to transmit drive to the spindle substantially without friction. Reference is particularly made to co-pending U.S. patent application Ser. No. 06/641,431, identified hereinabove.

In most pertinent part, the present invention includes a forward drive rotatable member which transmits drive in the forward direction to the spindle and a reverse drive member which imparts (under certain circumstances) reverse drive to the spindle to thereby permit movement of the tapping attachment, which is operably associated with the spindle, into and out of the workpiece in proper sequence. It should be understood that the forward drive member and the reverse drive member are constantly rotating during operation in opposite directions. The present invention also provides elements which make the forward and reverse drive members rotate at different rates of speed.

The differential forward and reverse drive feature permits the spindle to proceed into the workpiece at a different rate of speed than it retracts. Ideally, the spindle will be withdrawn from the workpiece at a slower rate of speed than it enters. Thus, the reverse drive member rotates at a slower rate of speed than the forward drive member.

This is a desirable feature since the automated machining centers with which the present type tapping attachments are used are computer programmed to move a tapping attachment itself as a unit, towards the workpiece at a slower rate of speed than the desired feed rate of the tap into the workpiece. This assures that the tap will progress into the workpiece at its own rate due to rotation of the spindle without adverse effects caused by the machining center itself.

The reverse rate of movement of the tapping attachment housing away from the workpiece is identical to the rate at which the tapping attachment proceeds there towards. Thus, the tap is being removed from the workpiece by the rotation of the spindle at a faster rate than the housing is moving away and constantly going between a neutral and reverse mode of operation, causing excessive wear unless the present invention is used. The present invention assures that the free axial float spindle rotates in the reverse direction slower than it did in forward. Thus, reverse drive is constantly maintained (once started) until the tap is out of the workpiece.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENT

Figure 1:
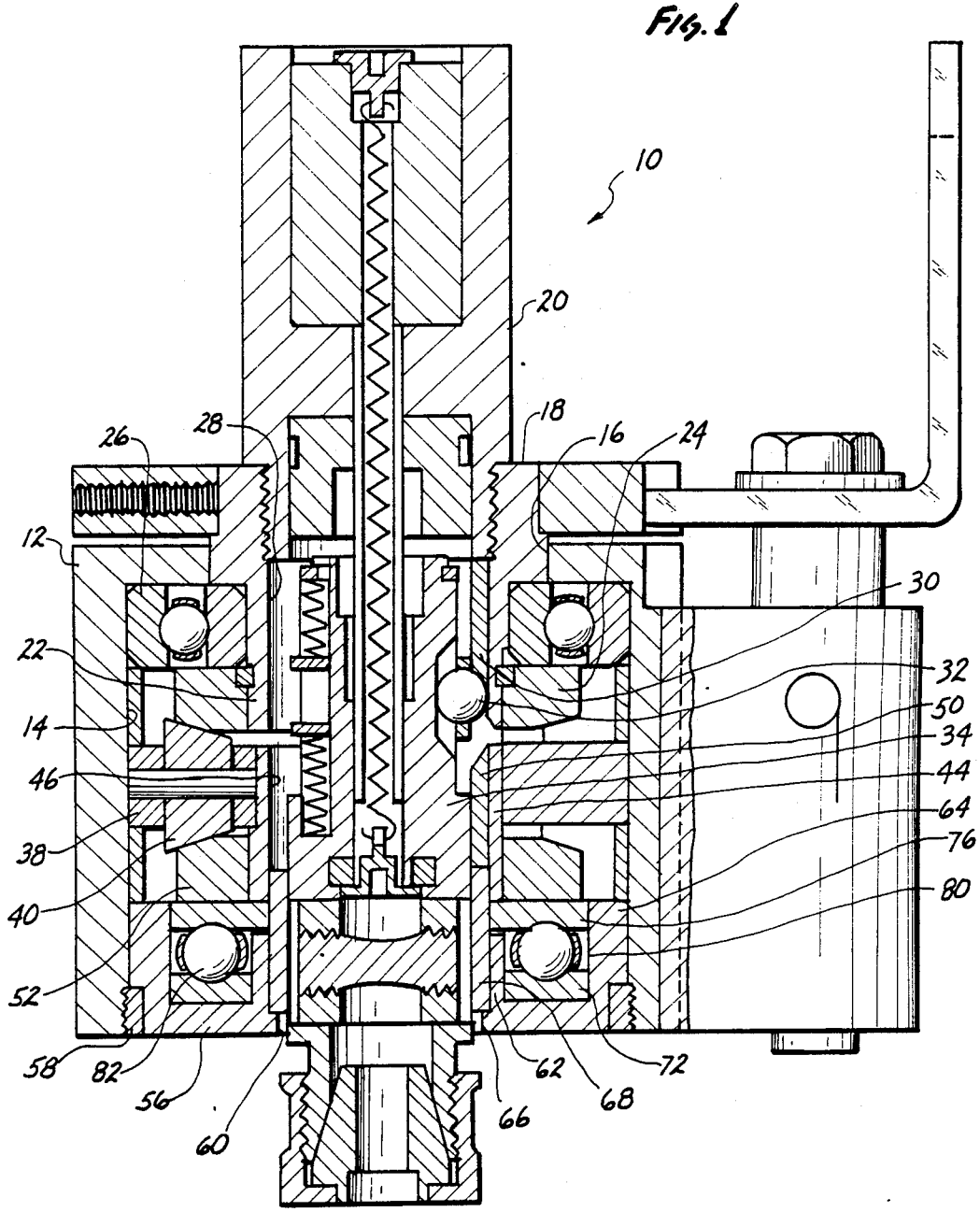
FIG. 1 is a partially sectioned view of a tapping attachment according to the present invention.

Referring now to the drawings, there is shown in FIGS. 1 an 3, an automatic attachment generally designated by the reference numeral 10 for use with a computer automated machining center (not shown) which drives the tap (not shown). The tapping attachment 10 includes a housing 12 having a central cylindrical bore 14. The bore 14 pierces through the top of the housing 12 as shown at 16. Received within the bore of the housing is a forward driver 18. The driver 18 includes a shank 20 and a flared bottom portion 22. The shank 20 of the driver 18 extends through the opening 16 of the housing so that it may be communicated with the machine. Secured at the bottom end of the driver 18 is a beveled gear arrangement 24 which is suitably secured or formed integrally with the flared portion 22 of the driver 18. Suitable bearings 26 are provided between the housing 12 and the driver 18 so that the same may be rotated within the housing. The beveled gear 24 has thirty-five (35) teeth.

The flared portion 22 of the driver 18 includes a bore 28. The surface of the bore is provided with periodically spaced inwardly projecting splines 30. The splines are engagable with drive balls 32 which are secured to a spindle 34 of the type generally described and claimed in co-pending U.S. patent application Ser. No. 06/641,431, the operating features and advantages thereof being incorporated herein by reference as though set forth fully. The spindle 34 is of the free axial float type and as rotation is imparted via driver 18 through balls 32 to the spindle 34, it will be understood by those skilled in the art that the spindle will axially progress independently of the housing towards the workpiece due to progressive movement of the tap (not shown) thereinto. As this occurs, the drive balls 32 will proceed along spline 30 until disengagement therewith occurs thereby causing spindle 34 to stop rotating and the tap (not shown) to proceed no further into the workpiece.

Also secured in the bore 14 of the housing 12 is a planet gear carrier 38. Mounted within the planet gear carrier are periodically spaced planet gears 40 which are arranged so as to engage the beveled gear portion 24 of the driver 18. The axis or the planet gears 40 are arranged so as to project a line normal to the axis of the spindle 34. Thus, rotation of the driver 18 causes rotation of the planet gears 40. The planet gears have twelve (12) teeth. It is to be understood that the planet gear carrier 38 is fixed relative to the housing by any conventional means suitable to accomplish the task.

Also provided within the housing for rotation is a reverse drive member 44 or reversing gear. The reversing gear mechanism includes a central bore 46 through which the spindle 34 passes. Like the driver 18, the inner surface of the bore 46 of the reversing gear 44 is provided with periodically spaced splines 50 which are used to engage the driving balls 32 as described hereinbelow. The reversing gear is also provided with a beveled gear portion 52 which has thirty-seven (37) teeth and is engagable with the planet gears 40 to cause counter-rotation to the driver 18 at a slower rate of speed.

It is to be understood then that when the spindle has sufficiently progressed into the workpiece (not shown) due to rotation of the driver 18, to accomplish the work task desired, the drive ball 32 will be disengaged from spline 30. At approximately this same point in time, the machine (not shown) will move the housing axially away from the workpiece while simultaneously causing rotation of driver 18. This movement of the housing 12, as just described, causes the drive ball 32 to come into engagement with spline 50 of the reversing gear which is rotating in a direction counter to that of spline 30 at a slower rate of speed. This is accomplished because the free axial float spindle is fixed relative to the workpiece due to penetration thereinto by the tap. Engagement of the drive ball 32 with the spline 50 of the reversing gear 44 causes the spindle and the tap to back themselves out of the workpiece and away therefrom at a slower rate of speed than the housing 12 is moving away from the workpiece so that the ball 32 stays in engagement with the spline 50 until the tap (not shown) is removed from the workpiece as more fully described hereinbelow.

Also situated within the bore of the housing 12 is a closure plate 56 which is retained therein by suitable means such as the threaded ring 58. The closure plate 56 includes a bore 60 through which the spindle 34 passes. The closure plate 56 is provided with inner and outer upwardly projecting walls, 62 and 64 respectively.

A further, radially projecting lip 66, is also provided and forms a stepped bore into which sleeve 68 is press fit. Sleeve 68 is thus fixed relative to closure plate 56, which in turn, is fixed relative to housing 12. Sleeve 68 receives spindle 34 and acts to journal the same for rotation within the housing.

Projecting walls 62 and 64 form a web-like circular structure. Received within the web-like structure formed by upwardly extending projections 62 and 64 of closure plate 56, is a ring 72 which includes a bearing receiving channel 74 (best seen by reference to FIG. 2). A similarly constructed ring 76 is located just under reversing gear 44 so as to trap a yoked ball bearing assembly 80 between it and the ring 72. The yoked bearing assembly includes a plurality of periodically spaced balls which ride within the channels of the rings 72 and 74.

It is to be understood by those skilled in the art that during axial movement of the tapping attachment 10 away from the workpiece so that withdrawal of the tap (not shown) from the workpiece will be accomplished, a thrust load is generated. This thrust load is absorbed by interaction of upper ring 76 with balls 82, lower ring 72 and closure plate 56.

Projecting wall 62 is substantially shorter than wall 64. Ring 72 is approximately the size of the distance between walls 62 and 64 so that a snug fit is achieved, thus guaranteeing that the ring 72 remains relatively stationary, and radial migration thereof is minimal.

Ring 76 is placed in close running relationship to the surface of wall 64, near the top thereof and extends inwardly over the top of wall 62. Ring 76 may rotate with the reverse drive mechanism 44. The close fit of ring 76 to wall 64 assures minimal radial migration thereof during rotation.

It is to be understood by those skilled in the art that the tapping attachment 10 is moved towards the workpiece during machining operations at a rate of speed slower than the desired rate of progress of the tap into the workpiece. Thus, the free axial float spindle 34 will proceed towards the workpiece at its own desired rate due to rotation thereof and interaction of the the tap (not shown) with the workpiece (not shown). The reverse rate of axial retraction of the tapping attachment 10 away from the workpiece (not shown) is programmed into the machining center to be identical to the rate of approach. If the reversed rate of rotation of spindle 34 were not slowed by the bevel gear arrangement described the spindle would race the ball 32 past spline 50 into a neutral mode of operation before complete withdrawal of the tap from the workpiece and cause the tapping attachment 10 to constantly shift into and out of reverse drive as the housing 12 continuously caught up to the spindle drive ball 32. This would cause unnecessary wear and tear on the tapping attachment 10 and is avoided by the arrangement described.

Figures 2, 3:
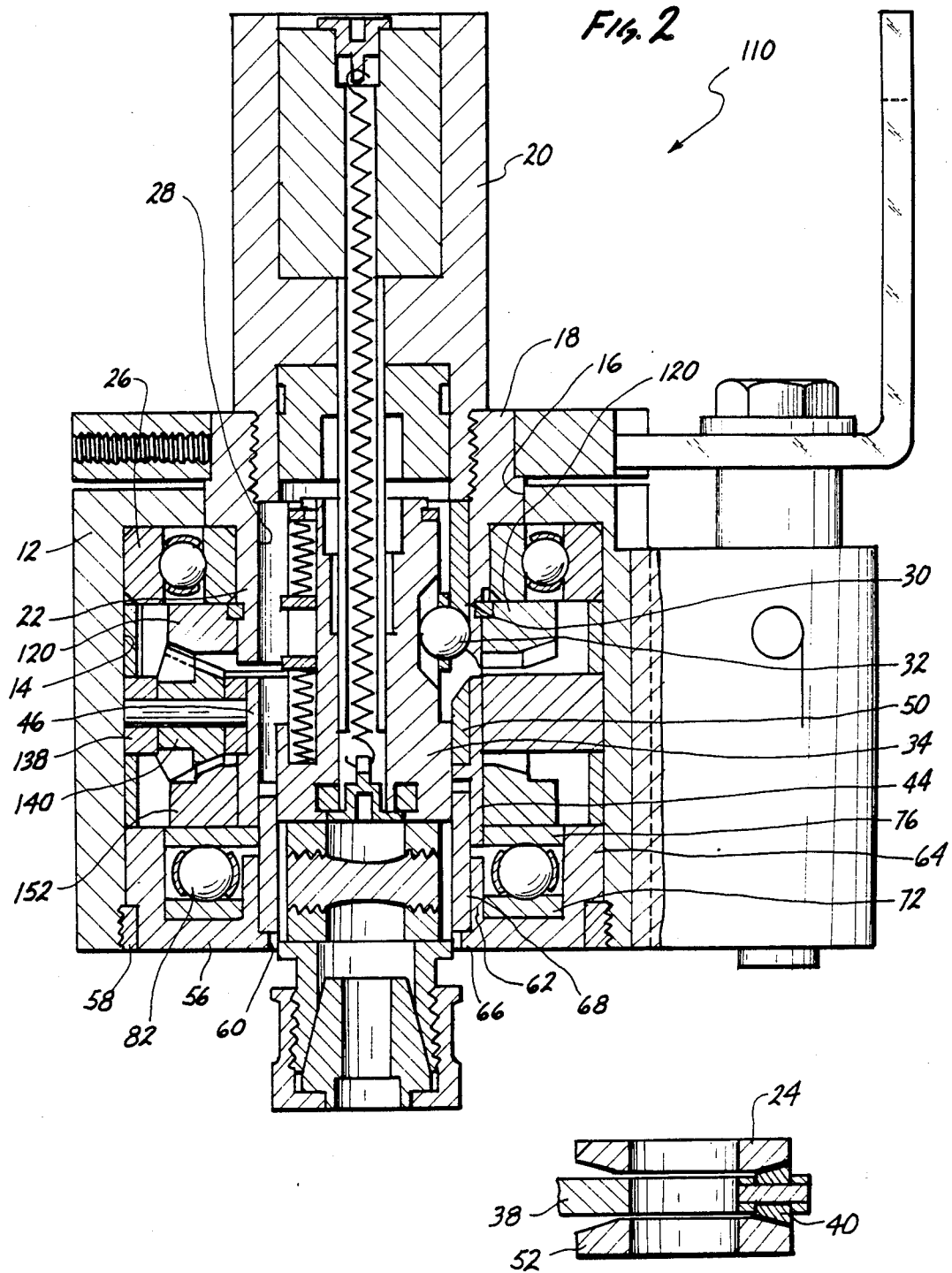
FIG. 2 is a partially sectioned view of an alternative embodiment of the present invention.
FIG. 3 is a cross-section view of the forward and reverse drive interconnection of the tapping attachment of FIG. 1.

Shown in FIG. 2 is an alternative embodiment of the present invention which accomplishes the same result of the arrangement depicted in FIGS. 1 and 3, and wherein identical elements are identically numbered, and modified elements are prefixed with a one (1); e.g., bevel gear 24 becomes bevel gear 124.

The only difference between the tapping attachment 110 and 10 is the provision of a split planet gear 140 and modified bevel gears 120 and 152 in place of their counterparts 40, 20 and 52 in the FIG. 1 embodiment. The description of common elements and function are hereby incorporated by reference as though repeated fully.

Planet gear 140 is a split gear having a different number of gear teeth at its outboard side than it does at its inboard side. Planet 140 may be formed as an integral unit or be composed of two different gears joined as by brazing. Bevel gear 120 is configured to contact only the outboard part of planet gear 140 and bevel gear 152 is configured to contact only the inboard portion of beveled gear 140. Thus by proper selection of gear ratios, any desired rate of counter-rotation of reverse drive member 44 may be achieved relative to forward drive member 18.

From the foregoing, those skilled in the art will readily understand the nature of the invention and the manner in which the mechanisms operate both in direct and reverse drive. It is to be understood that the above described embodiment is merely illustrative of some of the many specific embodiments which the present invention can take. Clearly, numerous and varied other arrangements may readily be devised by those skilled in the art without departing from the spirit and scope of the invention and the above description is to be understood as illustrative rather than limiting. The full scope of the invention is considered to be set forth in the appended claims hereto and is limited only thereby.

What is claimed is:

1. A tapping attachment including:
    a housing;
    a forward drive member received within the housing and associatable with a source of rotational drive to cause rotation of the forward drive member relative to the housing at a first speed;
    a reverse drive member received within the housing for rotation relative thereto in a counterdirection to the direction of rotation of the forward drive member at a second speed,
    means for causing simultaneous counter-rotation of the forward and reverse drive members at said first and second speeds;
    a free axially floating tapping spindle associatable with the forward drive member to cause rotation of the spindle therewith at said first speed and associatable with the reverse drive member to cause counter-rotation of the spindle therewith relative to the forward drive member at said second speed, and
    said first speed being greater than said second speed.

2. A tapping attachment including:
    a housing;
    a forward drive member received within the housing and associatable with a source of rotational drive to cause rotation of the forward drive member relative to the housing at a first speed;
    a reverse drive member received within the housing for rotation relative thereto in a counterdirection to the direction of rotation of the forward drive member at a second speed;
    means for causing simultaneous counter-rotation of the forward and reverse drive members at said first and second speeds, said means for causing simultaneous counter-rotation comprising:
        (1) a forward drive bevel gear having a first quantity of teeth associated with said forward drive member for rotation therewith;
        (2) a reverse drive bevel gear having a second quantity of teeth associated with said reverse drive member for rotation therewith;
        (3) a planet gear means for communicating said forward drive and reverse drive bevel gears for counter-rotation;
    a free axially floating tapping spindler associatable with the forward drive member to cause rotation of the spindle therewith at said first speed and associatable with the reverse drive member to cause counter-rotation of the spindle therewith relative to the forward drive member at said second speed;
    said first speed being greater than said second speed; and
    wherein said first quantity of teeth is less than said second quantity of teeth to cause said reverse drive member to rotate at a slower rate of speed than said forward drive member.

* * * * *